United States Patent [19]

Claude et al.

[11] 4,382,127
[45] May 3, 1983

[54] PROCESS FOR THE PREPARATION OF SUSPENSIONS OF POLYMERS; SUSPENSIONS OF SAID POLYMERS; AND USES OF SAID SUSPENSIONS

[75] Inventors: Bruno Claude, Montivilliers; Jean-Jacques Labaig, Le Havre; Christian Martinez, Harfleur, all of France

[73] Assignee: Compagnie Francaise de Raffinage, Paris, France

[21] Appl. No.: 299,210

[22] Filed: Sep. 3, 1981

[30] Foreign Application Priority Data

Sep. 9, 1980 [FR] France ................ 80 19404

[51] Int. Cl.³ .................... C08F 6/00; C08F 6/24; C08J 3/08; C08L 23/04
[52] U.S. Cl. .................... 524/504; 524/529; 528/481; 528/502
[58] Field of Search ............ 260/34.2, 33.6 UA; 528/502; 524/504, 529

[56] References Cited

U.S. PATENT DOCUMENTS 3,971,749  7/1976  Blunt ........................ 260/34.2
3,981,958  9/1976  Nakashima et al. ........ 525/310
3,997,488  12/1976 Tsubuko et al. ........... 260/28.5 R
4,012,270  3/1977  Fitko ......................... 525/65
4,087,393  5/1978  Tsubuko et al. ........... 260/33.6 UA
4,125,700  11/1978 Graham ................... 260/34.2
4,199,622  4/1980  Kokumai et al. .......... 427/239
4,250,227  2/1981  Claude ...................... 525/310

FOREIGN PATENT DOCUMENTS 571814  9/1945  United Kingdom.
2036773  7/1980  United Kingdom.

OTHER PUBLICATIONS

Derwent Abs. 42153 C/24, Toyo Ink (JS5057460).
Derwent Abs. 12585 B/07, Toyo Ink (JS4000085).
Derwent Abs. 53711 D/30, Ciefran. Raff (FR2470002).
Derwent Abs. 53715 D/30 Ciefran. Raff (FR2470060).

Primary Examiner—Melvyn I. Marquis
Assistant Examiner—Herbert J. Lilling
Attorney, Agent, or Firm—Curtis, Morris & Safford

[57] ABSTRACT

The invention relates to a process for the preparation of suspensions of at least one polymer, said process comprising as a first step the preparation of a first suspension of at least one polymer in an organic liquid by chilling a solution of said polymer.

In accordance with the invention, there is added to the first polymer suspension in a second step a powder of at least one polymer, which may be the same as or different from the first.

Use of said process in the production of two-layer composites formed of an aluminum sheet and a polymer layer.

7 Claims, No Drawings

PROCESS FOR THE PREPARATION OF SUSPENSIONS OF POLYMERS; SUSPENSIONS OF SAID POLYMERS; AND USES OF SAID SUSPENSIONS

The invention relates to a process for the preparation of suspensions of polymers. It further relates to said suspensions and to their uses.

Polymer suspensions can be prepared in different ways.

For example, as described in the article by Tze Cheng and Memering in PLASTICS WORLD, January 1968, pages 28 et seq., and in the article by M. C. Sharry, Howell and Memering in PLASTIQUES MODERNES ET ELASTOMERES, April 1968, pages 71 et seq., polyethylene dispersions can be prepared from polyethylene powders of a particle size of not less than 8 microns and not more than 30 microns, the polyethyene powder being dispersed in water or in an organic compound. However, these dispersions have the drawback that they separate and are difficult to rehomogenize, which is a disadvantage in their use, particularly in the coating of substrates. A variety of substrates, such as paper, metals and fabrics, can be coated with dispersions. The article in PLASTICS WORLD states that the thickness of the polyethylene film on a metallic substrate coated with such suspensions is of the order of one thousandth of an inch, i.e., about 25 microns.

Although the particle size of the polyethylene contained in these dispersions is small, the applicants have found in earlier work that it is preferable to use a suspension of the polymer in an organic liquid obtained by the rapid cooling of a solution of said polymer. The preparation of suspensions of polymers by rapid cooling is described in French Pat. No. 945962.

The use of such suspensions makes it possible to obtain a very thin polymer layer having a thickness of the order of one micron on the substrate. This use thus results in raw-material savings.

The applicants have further found that when such suspensions are used, the layer of polymer with which the substrate is coated will already adhere to the substrate after the organic liquid has been evaporated and before the polymer has been melted. This cannot be accomplished with the dispersions described in the articles cited. Moreover, the use of these suspensions makes it possible to obtain, after the polymer has been melted, a very thin but uniform and continuous film, which also cannot be achieved with dispersions where the particle size of the polymer ranges from 8 to 30 microns. The advantage of these suspensions obtained by cooling is that they are stable.

Said earlier work of the applicants' coworkers led to the issuance of French Pat. No. 2,386,402, which relates to a process for coating a substrate with a polymer layer. Said process involves:

(a) preparation of a suspension of a polymer in an organic liquid;

(b) coating of the substrate with said polymer suspension; and (c) elimination of the organic liquid; and is characterized in that the polymer suspension is obtained by chilling a solution of the polymer.

The applicants have found that above a particular concentration, for a given polymer, the suspension was no longer homogeneous, which is detrimental to its use for coating substrates. For a high-density polyethylene, for example, this limiting concentration was about 8 weight percent.

The applicants have found a way of obtaining more highly concentrated, homogeneous and stable polymer suspensions, which eliminates the need for handling large amounts of solvent.

The object of the present invention thus is to prepare concentrated and stable polymer suspensions.

The invention thus relates to a process for the preparation of a concentrated suspension of at least one polymer, said process comprising as a first step the preparation of a first suspension of at least one polymer in an organic liquid by chilling a solution of said polymer, and being characterized by a second step in which there is added to the first suspension obtained in the first step a powder of at least one polymer, which may be the same as or different from the first polymer. This addition results in the formation of a concentrated final suspension.

For the preparation of the suspensions in accordance with the invention, the applicants have been using particularly polyethylene. However, they have also used graft copolymers obtained by polymerization of ethylene or propylene and grafting of a small amount of acrylic acid. Such grafting may be effected by extrusion of a powder of a polymer to which carboxylic acid has been added, said powder having first been irradiated in an electron accelerator.

Suitable liquids for preparing the first suspension are organic liquids conventionally employed as solvents for homopolymers or copolymers of ethylene and propylene, in particular hydrocarbons such as paraffinic or cycloparaffinic hydrocarbons, and more particularly hexane, cyclohexane, isooctane, etc.

The concentration of the polymer used in the first suspension depends on the polymer and on the organic liquid used. Thus, when the organic liquid is cyclohexane and the polymer is high-density polyethylene, whether or not grafted with acrylic acid, the concentration of the polymer is preferably under 8 weight percent. The applicants have found that above this limit of 8 percent the suspension is no longer homogeneous. For other polymer/organic liquid pairings, the limiting concentrations may be below or above 8 weight percent.

The first suspension to be used in the process in accordance with the invention is obtained by chilling a solution of the polymer. The applicants have found that to obtain polymer suspensions suitable for use in the process in accordance with the invention it is necessary in chilling that the temperature of the solution be rapidly lowered to a level which depends on the polymer and on the solvent used. The temperature of the solution prior to chilling is not critical but should be sufficiently high for the polymer to be dissolved in the solvent.

In the case of low- or high-density polyethylene, whether or not grafted with acrylic acid, and of cyclohexane, it is preferable that the chilling, and hence precipitation, temperature be 50° C. or less.

In the case of polypropylene onto which acrylic acid has been grafted, the chilling temperature is preferably 40° C. or less.

The second step of the process in accordance with the invention comprises adding to the first suspension of at least one polymer a powder of at least one polymer with agitation at a temperature between 20° and 60° C.

The polymers which may be added in the form of a powder to the first suspension may be the same as or different than those used to prepare the first suspension.

Thus the applicants have used powders of graft copolymers obtained by polymerization of ethylene or propylene and grafting of a small amount of acrylic acid.

The particle size of the polymer powder added to the first suspension to obtain the final suspension may range from 5 to 80 microns.

The polymer powder is added in such an amount that the final suspension has the desired total polymer concentration. That concentration may range from 10 to 25 weight percent, for example.

The final suspensions obtained are homogeneous and separate very little, which is not the case when a powder is dispersed in the solvent.

The suspensions in accordance with the invention may be used in particular to coat a substrate.

The suspensions in accordance with the invention lend themselves to the coating of a wide range of substrates, such as metals, other polymers, glass, paper and fabrics.

The coating of the substrate may be effected by means known in the art. It may, for example, be effected by roller coating.

The organic liquid contained in the suspension is then eliminated from the coated substrate by drying the substrate, for example, by heating it in a tunnel kiln.

After the organic liquid has been eliminated, the thickness of the polymer layer with which the substrate has been coated may be in the neighborhood of one micron. If the substrate has been heated to a temperature high enough for the polymer to melt, the coating will be continuous.

For polyethylene and polypropylene, that temperature should be above 150° C. and 180° C., respectively. In the case of a metallic film that has been coated with polymer, melting of the polymer layer may be secured by calendering the film on a cylinder which has been heated to a sufficiently high temperature.

Two-layer composites formed of an aluminum film coated with a layer of graft polymer may be used to close containers. Such composites may be bonded to the containers by means of a heat-sealing operation.

In heat-sealing, the composite is held to the container for a very short time (a few seconds) at a temperature which depends on the nature of the composite and of the container. The temperature should be such that the composite is strippable. If the temperature is too high, the composite cannot be stripped.

For a polyethylene container, the heat-sealing temperature may range from 160° to 210° C.

For a polypropylene container, the heat-sealing temperature may range from 200° to 250° C.

When two-layer composites are used to form container closures, it is advantageous to provide a tab on the cap or lid to facilitate its being pulled off.

Moreover, pulling it off may be partial so that the cap remains attached to the container, it then being possible to reclose the container with the cap after making use of it.

Generally, such two-layer composites are suitable for use as closures for containers of any shape, such as boat-shaped containers, bottles, etc. They lend themselves well to being used as closures for bottles containing liquid products (sterilized milk, fruit juices, etc.).

Two-layer composites formed of an aluminum film coated with a layer of graft polymer may be used to produce three-layer composites. Thus, the aluminum film may be bonded to a film of polyethylene or polypropylene.

The examples which follow, which should not be construed as limiting the invention in any way, relate to the preparation of polymer suspensions by the process in accordance with the invention and to the use of suspensions so prepared to coat substrates.

EXAMPLE 1

This example relates to the preparation of three suspensions, A, B and C, in accordance with the process of the invention.

Preparation of suspension A

A suspension A1 was first prepared by dissolving in heptane, at 150° C., a polymer P1, namely, a high-density polyethylene having a weight-average molecular weight $M_w$ of 120,000, a number-average molecular weight $M_n$ of 15,000, and a density of 0.960, and having 1 weight percent acrylic acid grafted thereon.

The polymer was added in such an amount that the concentration of the solution was 5 weight percent.

Suspension A1 was obtained by rapidly cooling the solution to 30° C.

The final suspension A was obtained by dispersing in suspension A1 by agitation at 20° C. a powder of a polymer P2, which was the same as P1 and whose particle size was 50 microns or less.

The powder was added in such an amount that the final polymer concentration was 18 weight percent.

It was found that suspension A was very slow to separate and in any case very easy to rehomogenize. After 24 hours, the suspension stabilized at a separation level of less than 2%.

If, on the other hand, the powder of polymer P2 described above is dispersed directly in heptane, a homogeneous suspension is not obtained.

Preparation of suspension B

A suspension B1 was first prepared by dissolving two polymers, P3 and P4, in heptane at 150° C.

(a) P3 was a graft polyethylene identical to polymer P1 used to prepare suspension A. It was added in such an amount that its concentration in the solution was 3 weight percent.

(b) P4 was a low-density polyethylene of molecular weights $M_w$ of 65,000 and $M_n$ of 16,000 and a density of 0.960. It was added in such an amount that its concentration in the solution was 3 weight percent.

Suspension B1 was obtained by cooling the solution rapidly to 30° C.

The final suspension B was obtained by dispersing in suspension B1 through agitation at 20° C. a powder formed of a mixture of 50 weight percent each of polymers P3 and P4 used to prepare suspension B1.

The powder was added in such an amount that the final polymer concentration was 18 weight percent.

It was found that suspension B was very slow to separate and in any case very easy to rehomogenize. After 24 hours, the suspension stabilized at a separation level of less than 2%.

If, on the other hand, the powder of polymer P2 described above is dispersed directly in heptane, a homogeneous suspension is not obtained.

Preparation of suspension C

A suspension C1 was first prepared by dissolving two polymers, P6 and P7, in heptane at 150° C.

(a) P6 was a graft polyethylene identical to polymer P1 used to prepare suspension A. It was added in such an amount that its concentration in the solution was 1.8 weight percent.

(b) P7 was a grade 2 polypropylene (conforming to standard ASTM D 1238, load 2.16 kg at 230° C.) having 1 weight percent acrylic acid grafted thereon. It was added in such an amount that its concentration in the solution was 4.2 weight percent.

Suspension C1 was obtained by cooling the suspension rapidly at 40° C.

The final suspension C was obtained by dispersing in suspension C1 through agitation at 20° C. a powder formed of a mixture of 30 weight percent P6 and 70 weight percent P7.

The powder was added in such an amount that the final polymer concentration was 18 weight percent.

It was found that suspension C was very slow to separate and in any case very easy to rehomogenize. After 24 hours, the suspension stabilized at a separation level of less than 2%.

If, on the other hand, the powder of the polymer described above is dispersed directly in heptane, a homogeneous suspension is not obtained.

EXAMPLE 2

This example relates to the preparation of two- and three-layer composites from the suspensions prepared in Example 1.

(A) Preparation of two-layer composites

An aluminum sheet having a thickness of 50 microns was coated with the suspension by means of a transfer roller.

The coated sheet was then passed through a tunnel kiln at 120° C. to eliminate the solvent, and then over a cylinder heated to 240° C. to melt the coating.

Three two-layer composites were thus prepared. These are listed in Table 1 which follows.

TABLE 1

| Two-layer composite | Suspension used | Thickness of polymer layer, in microns |
|---|---|---|
| AA | A | 3 |
| BB | B | 6 |
| CC | C | 4 |

(B) Preparation of three-layer composites

The composites AA, BB and CC were calendered at 240° C. between two cylinders with a polymer film of a thickness of 50 microns.

In this way, three three-layer composites were produced. These are listed in Table 2 which follows.

TABLE 2

| Three-layer composite | Two-layer composite used | Type of polymer of film |
|---|---|---|
| AAA | AA | Polyethylene[1] |
| BBB | BB | Polyethylene[1] |
| CCC | CC | Polyethylene[2] |

[1] High-density polyethylene having molecular weights $M_w$ of 120,000 and $M_n$ of 15,000 and a density of 0.960.
[2] Grade 2 polypropylene (conforming to standard ASTM D 1238, load 2.16 kg at 230° C.).

EXAMPLE 3

This example relates to tightness and strippability tests performed on containers closed with the two-layer composites prepared in Example 2.

A bottle made of high-density polyethylene (d=0.960) or of polypropylene was filled with water and then closed by means of the composite sealed onto its neck. The neck was round; its diameter was 44 mm and its thickness 2.5 mm.

For the composites AA and BB, a polyethylene bottle was used.

For the composite CC, a polypropylene bottle was used.

Sealing was effected by applying the composite to the bottle neck by the use of a heating plate for two seconds and with such pressure that the bottles were compressed 2 mm.

The heating plate was heated to 200° C. for the composites AA and BB and to 220° C. for the composite CC.

(A) Tightness tests

The bottle was then laid on the floor, and its tightness at the level of the cap was checked by loading it with the weight of one person.

The bottles sealed with the composites were found to be tight.

(B) Strippability tests

Two types of tests were run, namely, qualitative tests and quantitative tests.

(1) Qualitative tests

The sealed bottles used in the tightness tests were subjected to tests in which it was sought to pull off the caps formed from the composites by hand, using a tab with which they had been provided.

It was found that the composite AA was not strippable whereas the composites BB and CC could readily be pulled off.

(2) Quantitative tests

The force required to pull off the sealed cap was measured on an INSTRON tensile-strength testing machine for plastics which had been specially equipped to hold the bottle firmly by its neck in a movable lower jaw, with a fixed upper jaw holding the cap stationary by its tab.

The pulling force was exerted in a plane substantially perpendicular to the plane in which the cap had been heat-sealed to the neck.

The results of these tests are presented in Table 3 which follows.

TABLE 3

| Composite | Pulling force, in daN | Notes |
|---|---|---|
| AA | 1.7 | Cap was torn |
| BB | 1 | Cap was pulled off in its entirety |

TABLE 3-continued

| Composite | Pulling force, in daN | Notes |
| --- | --- | --- |
| CC | 0.7 | without being torn As above |

This example shows that the process in accordance with the invention makes it possible to obtain two-layer composites which can be used as hermetically sealing caps for containers, and these caps may be adapted to be pulled off.

EXAMPLE 4

This example relates to adherence tests performed on the three-layer composites produced in Example 2.

Peel-type tests were run on these composites in which the adherence values of the polyethylene or polypropylene and aluminum films were measured while they were being subjected to opposed tensile forces, the composite being held perpendicularly to the forces acting on it.

Measured was the peeling adherence, which is the average force per unit thickness of the test piece required to cause two films to separate when they are spread apart at a uniform rate of 120 mm/minute.

The results obtained are presented in Table 4 which follows.

TABLE 4

| Composite | Adherence, in daN/10 mm |
| --- | --- |
| AAA | 0.800 g |
| BBB | 0.700 g |
| CCC | 0.500 g |

The values obtained may be regarded as good. The process in accordance with the invention thus permits the production of three-layer composites whose layers possess good adherence, which is of interest with respect to the end use.

We claim:

1. A process for the preparation of stable suspensions with higher concentrations of solid polymer particles, comprising preparing a first suspension of at least one polymer in an organic liquid by chilling a solution of said polymer, and then adding a powder of at least one polymer, which may be the same as or different from the first polymer, to said first polymer suspension to achieve a stable final suspension having a concentration greater than would normally be achieved by the first step alone and also greater than normally could be achieved by direct suspension of said powder in said organic liquid.

2. A process according to claim 1, wherein the amount of polymer added in the second step is such that the final concentration of the suspension ranges from 10 to 25 weight percent.

3. A process according to claim 1, wherein the particle size of said polymer powder ranges from 5 to 80 microns.

4. A process according to claim 2, wherein the particle size of said polymer powder ranges from 5 to 80 microns.

5. A process according to one of claims 1 to 4, wherein the polymer used in the first and the polymer used in the second step are the same, said polymer being a graft copolymer obtained by polymerization of ethylene and grafting with acrylic acid.

6. A process according to one of claims 1 to 4, wherein a mixture of the polymers are used in the first step and the same mixture of polymers are used in the second step, said mixture consisting of a low-density polyethylene and a graft copolymer obtained by polymerization of ethylene and grafting with acrylic acid.

7. A process according to one of claims 1 to 4, wherein the polymers used in the first and second steps are the same, being two graft copolymers obtained by polymerization of ethylene and propylene, respectively, and by grafting with acrylic acid.

* * * * *